United States Patent Office 3,435,755
Patented Apr. 1, 1969

3,435,755
SERIAL ROASTING APPARATUS WITH
PRODUCT TURNER
Alfred Löhr and Helmut Hemmann, Herborn, and Karl
Tropp, Werdorf, Germany, assignors to Burger Eisen-
werke Aktiengesellschaft, Wetzlar, Germany, a corpo-
ration of Germany
Filed May 23, 1967, Ser. No. 640,532
Claims priority, application Germany, May 25, 1966,
B 87,278
Int. Cl. A47j 37/04
U.S. Cl. 99—424                                 7 Claims

ABSTRACT OF THE DISCLOSURE

Apparatus for the serial roasting of flat comestible objects in which the pieces of comestible are drawn along a roasting surface heated from below and are turned at substantially the half-way point in their movement therealong by a turning device in the form of a drum journaled at one end at the side of the apparatus and having a throughgoing longitudinal slot extending diametrically through the drum and open at the other end; a plurality of flights constitute the means for displacing the meat along the roasting surface, each of the flights being cantilevered at the side of the apparatus proximal to the open end of the drum and passing diametrically therethrough in the stationary condition of the periodically operating drum. The flights are displaced periodically by a chain programmed or timed synchronously with the gear drive at the supported end of the drum to halt the flights when the drum is rotated.

---

Figure 1:
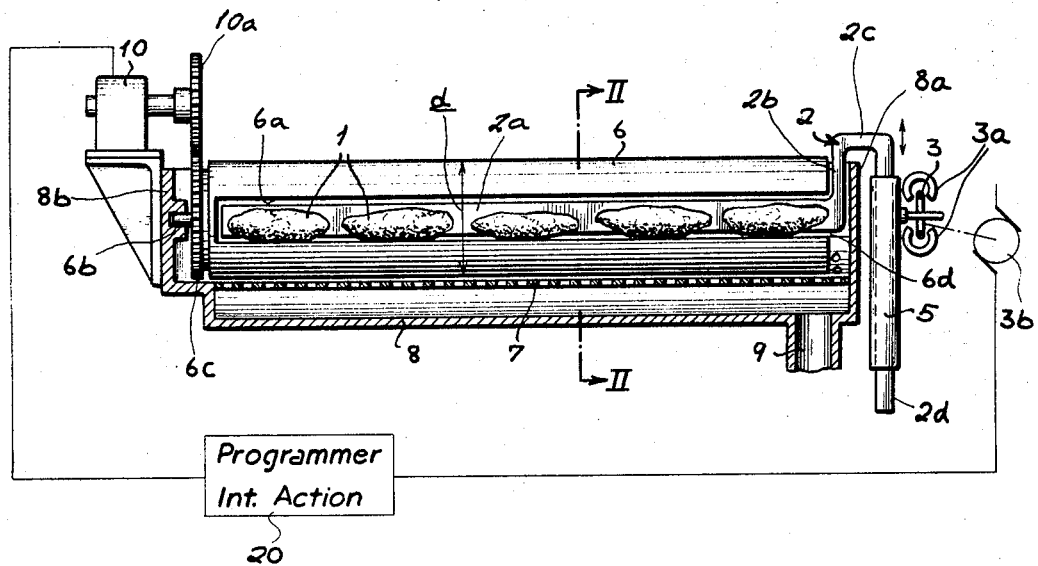

Our present invention relates to an apparatus for the high-rate roasting of comestibles such as flat pieces of meat and, in general, for the cooking of a multiplicity of articles on both sides.

The large-scale serial cooking of comestibles such as meat can be carred out by continuously displacing the food products in baskets, on spits or on grates along a plurality of infrared heaters, by drawing the comestible items through a fat bath or by exposing the moving articles to radiant heat or conductive heat along a continuous surface defining a transport path for the comestibles in accordance with numerous problems for the high-rate cooking of such items. In general, apparatus designed to ensure even roasting of flat meat products, in which the pieces of meat must be turned over for exposure to heat, have not proved satisfactory because of the complexity of the turning systems and the difficulty of maintaining complex apparatus with numerous moving parts in the region of a roasting machine which develops elevated temperatures, is characterized by deposition of fatty wastes along exposed surfaces, requires careful cleaning, and must be provided with intricate oiling and mounting systems for the turning means as well as the conveying system.

It is, therefore, the principal object of the present invention to provide an improved system for the turning of pieces of meat in a roasting device wherein the sides of the meat are exposed to heat in a roasting or cooking process.

A more specific object of this invention is to provide a roasting apparatus for the serial roasting of large numbers of comestible items in which the disadvantages of earlier turning arrangements, flipping mechanisms and the like are obviated.

Still another object of our invention is to provide an improved roasting apparatus having a turning device of simple and inexpensive but reliable construction, which does not present dangers to the moving parts or operating personnel, which is capable of serving a relatively large number of pieces simultaneously, and which eliminates possible interference between the conveyor system and the turning mechanism.

We have found that these objects can be attained in a system for the substantially continuous roasting of flat comestible articles, generally pieces of meat, which embodies in part structure described and claimed in our commonly assigned concurrently filed copending application Ser. No. 640,535 entitled, "Apparatus for the Frying or Roasting of Comestibles." In that application, we describe a system wherein a plurality of pieces of meat or other comestible are drawn simultaneously by cantilevered conveyor flights along a closed annular transport path and eventually are discharged over an exit ramp, the conveyor flights pushing a row of roastable or fryable pieces along a heating surface which, in turn, is heated from below. In the following description and discussion, it will be understood that apart from the turning mechanism and conveyor drive, the roasting apparatus may be of the type described, illustrated and claimed in the aforementioned commonly assigned and concurrently filed copending application.

We have now found that, when the conveyor means for advancing rows of pieces of meat successively across the roasting surface are cantilevered at one side ot the transport path, all of the aforementioned disadvantages of earlier turning systems can be obviated by constituting the turning device in the form of a shaft or drum extending athwart this transport path, transversely to the direction of displacement of the rows of pieces to be turned but, preferably, parallel to these rows and the flights, the drum or shaft being journaled in the apparatus at the other side of the transport path and only at one end remote from the side of the transport path at which the flights or pushing members are cantilevered. This journaling arrangement, however, does not exclude supporting the drum at one or more locations along its periphery.

According to an important feature of this invention, the drum of shaft is provided with a longitudinal slot extending diametrically through the drum or shaft to form a throughgoing diametral passage for the rows of meat pieces and of a width sufficient to clear the flights or pusher bars as they pass through the meat-turning drum or shaft when its slots lies in a plane parallel to the plane of movement of the flights and the pieces of meat. Furthermore, this slot opens axially outwardly at the end of the shaft or drum remote from its drive means and, therefore from its end proximal to the side of the transport path at which the flights or pushers are cantilevered, the flights passing through the drum as they sweep beyond the turning means along the transport path. The drum and conveyor are synchronized for intermittent and alternate periodic operation so that for the stationary period of the drum, a turned row of meat is led out of the slot and a further row of meat, roasted only on one side, is advanced into the slot before the drum is rotated. The drum has a diameter which preferably is slightly less than the spacing between the flights or pushers and is partly recessed in a perforated guide whose center of curvature corresponds to the axis of rotation of the drum so that the lowermost face of the slot, when the latter is parallel to the direction of movement of the meat, is substantially coplanar with the roasting surface. Advantageously, a collecting trough surrounds the sieve or perforated guide member and serves to collect juices cascading from the pieces of meat as they are turned.

Figure 2:
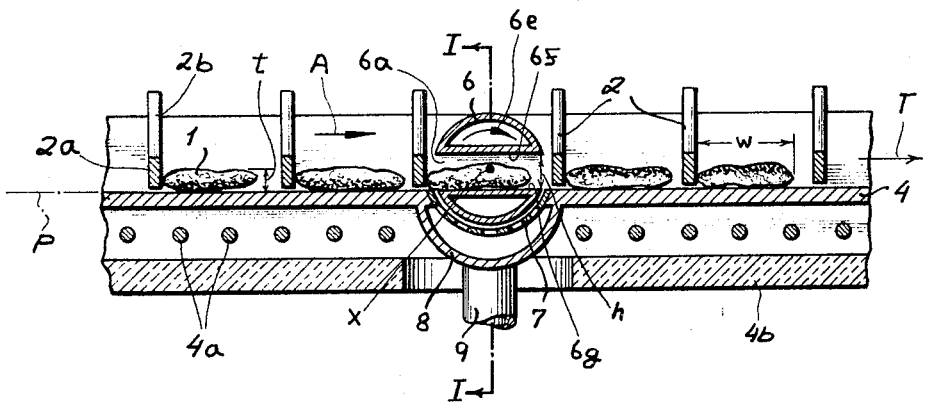

The above and other objects, features and advantages of the present invention will become more readily apparent from the following description, reference being made to the accompanying drawing in which:

FIG. 1 is a cross sectional view taken transversely to the direction of movement of the comestible products of a roasting apparatus according to this invention (line I—I of FIG. 2); and FIG. 2 is a cross sectional view taken generally along the line II—II of FIG. 1.

In the drawing, we show the turning station of an apparatus for the serial roasting of a section of comestible bodies, e.g., flattened meat patties or servings 1, the turning device being disposed substantially at the half-way point along a continuous transport path between an input means and an output means or as described in greater detail in the aforementioned copending application. The meat patties 1 are disposed in parallel rows transversely of the transport path T along which they are disposed in the direction of arrow A by a multiplicity of pusher bars or flights 2 whose spacing exceeds the width of the pieces 1 but which have a length sufficient that their horizontal arms 2a extend athwart the transport path T over the greater part of its width. The arms 2a are affixed to respectively downwardly extending shanks 2b which reach over the wall 8a of the housing for the transport path at one side of the latter. From a bight 2c, each flight 2 terminates in a leg 2d which is vertically shiftable and removably received in a tubular shaft or sleeve 5. The latter, guided by means not illustrated in greater detail here, is shifted along the transport path T in the direction of arrow A by a chain 3 which, in turn, passes through a pair of channel guides 3a. Thus, the chain 3 may remain horizontal while the flights 2–2d rise and fall along inclined portions and ramps at the inlet and outlet sides of the apparatus as set forth in the aforementioned copending application. The drive means for the chain 3 can be an ordinary sprocket and motor arrangement, represented diagrammatically at 3b and shown in greater detail in the patent application mentioned earlier.

The arms 2a of the meat-entraining flights 2 ride slightly above or upon the roasting plate 4 which is heated from beneath by a multiplicity of radiant (infrared) heating rods 4a; below these rods, a ceramic, refractory and heat-insulating layer 4b is provided to act as a heat-storage reservoir and to reflect heat in the direction of the roasting surface 4, while preventing significant heat loss away from this roasting surface. The roasting plate 4 is integral with a semicylindrical collection trough 8 into which a perforated or wire-screen semicircular guide sieve 7 is recessed below the plane P of the roasting plate 4. The perforated guide surface or sieve 7 is coaxial with the turning drum 6 which rotates about an axis X and is formed with a diametrical slot 6a. The diameter d of this drum or shaft 6 is approximately equal to or slightly greater than the width w of the pieces while the axial height h of the slot 6a exceeds the thickness t of the pieces passing therethrough. As can be seen from FIG. 1, the shaft or drum 6 is journaled at 6b, i.e., its end remote from that at which the arms 2a are supported, in the housing wall 8b defining the other side of the transport path. A driven gear 6c at this end of the drum 6 meshes with a driving gear 10a of a motor 10 to rotate the drum 6 in the direction of arrow 6e. The slot 6a is, moreover, open axially at d to permit the arm 2a and its shank 2b to pass through and beyond the drum 6. The drum 6 is hollow to reduce its inertia and momentum and has the slot 6a defined between a pair of walls 6f and 6g which alternately support the meat upon every half revolution of the drum 6. When these surfaces are respectively lowermost, they lie in the plane P of the roasting surface 4.

A programmer 20 is coupled to the motors 10 and 3b for synchronous operation of the drum 6 and the flights 2.

Thus the flights 2 are intermittently advanced in the direction of arrow A along the plate 4 to roast the underside of the meat patties 1 by contact with the heated surface 4 on the left-hand side of the turning drum 6 (FIG. 2). The intermittent movement of the flights 2 is timed to occur only when the drum 6 is stationary and, between each advance of the flights, the drum 6 is given a half revolution about its axis in the clockwise direction (arrow 6e in FIG. 2). The rotation of the drum 6 permits the perforated guide plate 7 to support the meat as the drum is rotated through an upright position of the slot 6a to flip the meat over onto its other surface, the drum being immobilized then for the next advance of the flights to remove each row of meat in succession from the drum and advance another row into the latter. As the drum sweeps through each half revolution, the fat along the surface of the meat flows through the perforated plate 7, is collected in the trough 8 and is led away through the duct 9.

We claim:

1. An apparatus for the continuous cooking of comestibles on two sides, comprising:
 a heatable roasting surface forming a transport path for a succession of pieces of comestible, said surface being divided into two sections separated by a transverse gap;
 a rotatable reversing member extending across said transport path in said gap, said member being journaled for rotation about a fixed axis above said surface and being provided with an axial slot open toward one side of said path, said slot being bounded by a pair of parallel faces respectively alignable with said surface to bridge said sections in alternate operative positions of said member 180° apart;
 and intermittently operable conveyor means synchronized with the rotation of said member for advancing the pieces along said path and through said slot, with rotation of said member from one operative position into the other upon arrival of any piece in said slot, said conveyor means including a multiplicity of spaced-apart flights extending from said one side athwart said path just above said surface for sweeping said pieces into and out of said slot.

2. An apparatus as defined in claim 1 wherein said conveyor means includes a chain engaging said flights with freedom of relative vertical motion.

3. An apparatus as defined in claim 1 wherein said surface is formed by a metallic plate, said apparatus further comprising a plurality of radiant heaters underlying said plate and a wall of ceramic refractory thermally insulating material underlying said heaters.

4. An apparatus as defined in claim 1 wherein said member is a drum centered on said axis.

5. An apparatus as defined in claim 4, further comprising a perforated semicircular guide member closely hugging and coaxial with said drum and underlying same for guiding the pieces rotatably entrained by said drum as said slot sweeps over said guide member.

6. The improvement defined in claim 5, further comprising a fat-collecting trough underlying said guide member for collecting liquids passing therethrough.

7. The improvement defined in claim 5 wherein said guide member is a wire screen.

References Cited

UNITED STATES PATENTS

| | | | |
|---|---|---|---|
| 2,088,946 | 8/1937 | Carpenter | 99—405 XR |
| 2,107,325 | 2/1938 | Carpenter | 99—405 XR |
| 3,329,081 | 7/1967 | Roth | 99—405 |

WALTER A. SCHEEL, *Primary Examiner.*

JOHN M. NEARY, *Assistant Examiner.*

U.S. Cl. X.R.

99—423, 386, 443